(12) United States Patent
Einola et al.

(10) Patent No.: US 10,246,148 B2
(45) Date of Patent: Apr. 2, 2019

(54) CRAWLER-TRACK UNIT, FOREST MACHINE AND FOREST MACHINE ASSEMBLY

(71) Applicant: PONSSE OYJ, Vieremä (FI)

(72) Inventors: Kalle Einola, Vieremä (FI); Pentti Hukkanen, Vieremä (FI); Jorma Hyvönen, Vieremä (FI); Jukka Hyvönen, Vieremä (FI)

(73) Assignee: PONSSE OYJ, Vierema (FI)

( * ) Notice: Subject to any disclaimer, the term of this patent is extended or adjusted under 35 U.S.C. 154(b) by 76 days.

(21) Appl. No.: 15/337,118

(22) Filed: Oct. 28, 2016

(65) Prior Publication Data

US 2017/0057571 A1 Mar. 2, 2017

Related U.S. Application Data

(63) Continuation-in-part of application No. 15/333,162, filed on Oct. 24, 2016, now abandoned, which is a
(Continued)

(30) Foreign Application Priority Data

Apr. 25, 2014 (FI) ...................................... 20145385

(51) Int. Cl.
*B62D 55/084* (2006.01)
*B62D 55/065* (2006.01)
(Continued)

(52) U.S. Cl.
CPC ........... *B62D 55/084* (2013.01); *B62D 21/04* (2013.01); *B62D 55/04* (2013.01); *B62D 55/065* (2013.01); *B62D 55/12* (2013.01); *A01G 23/003* (2013.01)

(58) Field of Classification Search
CPC ...... B62D 55/084; B62D 21/04; B62D 55/04; B62D 55/065; B62D 55/12
(Continued)

(56) References Cited

U.S. PATENT DOCUMENTS

| 2,745,503 | A | * | 5/1956 | Fisher | ................ B62D 55/0842 |
| | | | | | 172/830 |
| 3,664,449 | A | * | 5/1972 | Vardell | .................. B62D 55/02 |
| | | | | | 180/9.48 |

(Continued)

FOREIGN PATENT DOCUMENTS

| EP | 1964757 A2 | 9/2008 |
| FI | 121991 B | 7/2011 |

(Continued)

OTHER PUBLICATIONS

International Search Report for PCT/FI2015/050283, dated Jun. 26, 2015.
Written Opinion for PCT/FI2015/050283, dated Jun. 26, 2015.
International Preliminary Report on Patentability for PCT/FI2015/050283, dated Mar. 2, 2016.
(Continued)

*Primary Examiner* — Jacob D Knutson
(74) *Attorney, Agent, or Firm* — Fisherbroyles, LLP; Robert Kinberg

(57) ABSTRACT

A modular crawler-track unit for a forest machine has an engine, a chassis with a pivot bearing and a crawler-track frame. A sleeve shaft is attached to the crawler-track frame to support the crawler-track frame on the pivot bearing. A drive wheel is mounted in bearings in the crawler-track frame inside a circulation of a crawler mat. A support is arranged in the crawler-track frame inside the circulation to support a part of the crawler mat against the ground. A drive shaft is mounted in bearings in the crawler-track frame coaxially with the sleeve shaft to transmit power to the
(Continued)

crawler-track unit. A shaft mounted in bearings on the crawler-track frame pivots the drive wheel to the crawler-track frame at a distance from the drive shaft. A power-transmission is fitted between the shaft and the drive shaft to transmit power from the drive shaft to the drive wheel.

15 Claims, 8 Drawing Sheets

Related U.S. Application Data continuation-in-part of application No. PCT/FI2015/050283, filed on Apr. 24, 2015.

(51) Int. Cl.
    *B62D 55/12*     (2006.01)
    *B62D 21/04*     (2006.01)
    *B62D 55/04*     (2006.01)
    *A01G 23/00*     (2006.01)

(58) Field of Classification Search
    USPC ........................................................ 180/9.21
    See application file for complete search history.

(56) References Cited

U.S. PATENT DOCUMENTS

| 5,373,909 | A | | 12/1994 | Dow et al. | |
|---|---|---|---|---|---|
| 5,622,234 | A | * | 4/1997 | Nagorcka | B62D 55/08 180/9.5 |
| 2008/0084111 | A1 | | 4/2008 | Rainer | |
| 2010/0148573 | A1 | | 6/2010 | Inaoka | |
| 2012/0242142 | A1 | * | 9/2012 | Kautsch | B62D 55/02 305/142 |
| 2012/0299371 | A1 | * | 11/2012 | Simula | B62D 55/02 305/124 |

FOREIGN PATENT DOCUMENTS

| JP | S6157474 A | 3/1986 |
|---|---|---|
| WO | 2004/016494 A1 | 2/2004 |

OTHER PUBLICATIONS

Search Report for Finnish Application No. FI20145385, dated Dec. 17, 2014, and English translation thereof.

* cited by examiner

CRAWLER-TRACK UNIT, FOREST MACHINE AND FOREST MACHINE ASSEMBLY

CROSS-REFERENCE TO RELATED APPLICATIONS

This application is a continuation-in-part of U.S. patent application Ser. No. 15/333,162, filed Oct. 24, 2016, which is a continuation-in-part of International Patent Application No. PCT/FI2015/050283, filed Apr. 24, 2015, designating the United States, and claiming benefit of Finland Patent Application No. 20145385, filed Apr. 25, 2014, the disclosures of which are incorporated herein by reference in their entirety.

FIELD OF THE INVENTION

The present invention relates to a modular crawler-track unit for a forest machine, which crawler-track unit includes:
a crawler-track frame,
a sleeve shaft attached to the crawler-track frame, for supporting the crawler-track frame in a pivot bearing belonging to the forest machine,
a crawler mat arranged in a circulation for distributing the surface pressure of the crawler-track unit,
at least one drive wheel mounted in bearings in the crawler-track frame on the inside of the circulation of the crawler mat, for rotating and supporting the crawler mat,
at least one idler wheel mounted in bearings in the crawler-track frame on the inside of the circulation of the crawler mat, for supporting the crawler mat,
support means arranged in the crawler-track frame, on the inside of the circulation of the crawler mat, for supporting the part of the spiral that is against the ground, which support means are arranged to conform according to the shape of the surface of the ground, in order to distribute the surface pressure of the crawler-track unit evenly, and
a drive shaft mounted in bearings in the crawler-track frame coaxially to the sleeve shaft in order to transmit power from the forest machine to the crawler-track unit, and to pivot the crawler-track unit to the pivot bearing belonging to the frame of the forest machine.

The invention also relates to a forest machine and forest machine assembly.

BACKGROUND OF THE INVENTION

The machines used in mechanical tree harvesting inevitably cause a certain loading on the floor of the forest, the ground, and, on thinning sites, also on the root systems of the trees left to grow. The problem is typically less in the case of a harvester, which does not need to carry a load in addition to its own weight, as a forwarder does. In other words, there is usually a significant difference in the surface pressure imposed by the machines on the ground. The surface pressure imposed on the ground by the machines has indeed been begun to the reduced by various known solutions, such as by using, in place of a conventional axle, a so-called set of swing-bogie axles, in which there are four wheels in place of a conventional axle, which are able to distribute the surface pressure over a wider area against the surface of the ground. The surface pressure has been reduced by using, for example, a crawler track made from steel or rubber, manufactured and developed for the purpose and running around the wheels of the swing bogie. Steel crawler tracks, surfaced with rubber, and other constructions based on the aforementioned materials, are also known from the prior art.

From the point of view of timber harvesting, the freezing of the ground in winter also has a great effect on the damage to the ground caused by mechanical timber harvesting. On frozen ground, timber harvesting can usually be performed using a forest tractor equipped with a traditional chassis construction, without significant ground damage. But if the winter is mild, the ground may not freeze properly, so that a forest tractor equipped with wheels will leave deep grooves after it, which the entity responsible for the timber harvesting may have to make good in summer. Due to this, an increasingly small surface pressure is required of forest tractors and forest machines in general, which reduces the creation of ground damage occurring in timber harvesting taking place in mild winters. In addition to ground damage, a problem may simply be that the ability of the forest machine to move forward is insufficient when the surface pressure imposed on the ground becomes too great, so that the forest machine sinks partly into the ground, or becomes stuck in place.

As is known, the surface pressure can be reduced by means of various bogie structures to be installed in connection with a swing bogie, in which case, in terms of operating principle, special crawler-track units are approached, though in these solutions obvious defects and/or problems can be detected. For example, in the case of a steel crawler track fitted in connection with a swing bogie, the transmission of power from the bogie's driving wheels is based on friction, and not on the shape-locking between toothing in the crawler track and a special drive wheel as in most actual crawler-track units and crawler-track vehicles. This means that the steel crawler track must be tensioned considerably tightly, if it is wished to avoid the danger of the track slipping. This tensioning then stresses the swing bogie unnecessarily, and particularly the structures of its bogie casing and the wheel hubs—while nevertheless being unable to ensure the reliable and certain transmission of power between the pneumatic tyres and the bogie. Such a bogie structure is also liable to pieces of wood and, for example, hard-packed snow, penetrating between the bogie and the wheels, which may cause even great stresses, particularly in the structures of the swing bogie casing and the wheel hubs. Similar bogies are also known in the form of various composite structures, such as rubber/steel composite structures.

On the other hand, the use of a pneumatic tyre, which is expensive in manufacturing costs, complicated in construction, and liable to puncturing, is, as such, questionable inside the bogie structures described above, due to which the pneumatic tyres could advantageously be replaced by some simpler, cheaper, and more durable construction. In addition, particularly in load-carrying forest machines, such as forwarders, the air pressure in the pneumatic tyres must be set to be very high, for example, 4-6 bar, on account of the load-bearing capacity and technical durability of the tyre, so that in practice the flexibility of the tyres is already very poor and the use of pneumatic tyres in the application is, as such, questionable. Further, a problem with the construction combining a swing bogie equipped, for example, with pneumatic tyres, and a crawler-track running around the pairs of wheels, is that the swing bogie does not distribute the surface pressure acting on the ground on a sufficiently large surface area. In other words, the surface pressure is higher precisely under the wheels of the pairs of wheels, the area between them being subject to a lighter loading and thus a lower surface pressure.

Finnish patent FI 121991 is known from the prior art and discloses a modular crawler-track unit, which can be used in existing forest machines in place of sets of bogie wheels, in order to reduce surface pressure. This crawler-track unit is attached to the forest machine in connection with a wheel hub, so that the shaft coming from the drive/differential wheels rotates the drive wheel of the crawler-track unit. In this crawler-track unit, three crawler wheels are used, which form a triangular endless circulation for the crawler track. However, there are more small support wheels against the ground, but these do not conform to the ground. The drive wheel of the crawler-track unit is also coaxial with the drive shaft. In order to achieve a sufficient grip for the drive wheel, the drive wheel should be covered by the crawler track over a sufficiently large area. Because the crawler-track unit is pivoted at its centre to the chassis of the forest machine, the crawler-track unit must be high. When being driven, the height of the crawler-track unit causes it to tend to rise vertically when crossing obstacles. This means that the pivoting movement of the crawler-track unit is very limited, attenuated, or even prevented. The rigid crawler-track unit is, in turn, very stiff on the ground and cannot conform to unevenness in the ground. In addition to the aforementioned problems, the construction has the problem that, due to the geometry of the circulation of the crawler track, it has disadvantageous angles of incidence and lag, which reduces the ability of the forest machine to progress over difficult ground, especially in deep snow, or deep soft ground, as well as when encountering sudden steep-edged obstacles such as stones or tree-stumps.

SUMMARY OF THE INVENTION

The invention is intended to create a crawler-track unit with better ground properties than crawler-track units of the prior art, by means of which the surface pressure acting on the ground can be reduced, at the same time permitting a forest machine using the crawler-track unit to move more rapidly over the ground despite local unevenness. The intention is also to create a crawler-track unit, which can be installed in existing forest machines equipped with sets of bogie wheels. The invention is also intended to create a forest machine with better ground properties than forest machines of the prior art, by means of which the surface pressure acting on the ground can be substantially reduced, at the same time as the more rapid movement of the machine is permitted, despite local unevenness in the ground. In addition the invention is intended to create a forest machine assembly easily interchangeable with the existing set of bogie wheels of a forest machine.

This intention can be achieved by means of a modular crawler-track unit for a forest machine, which crawler-track unit includes a crawler-track frame, a sleeve shaft attached to the crawler-track frame for supporting the crawler-track frame on a pivot bearing belonging to the forest machine, a crawler mat arranged to circulate to distribute the surface pressure, and at least one drive wheel and at least one idler wheel mounted in bearings in the crawler-track frame inside the circulation of the crawler mat, in order to rotate and support the crawler mat. In addition, the crawler-track unit includes support means arranged in the crawler-track frame inside the circulation of the crawler mat, for supporting a portion of the circulation against the ground, which support means are arranged to conform to the shape of the ground surface in order to distribute the surface pressure of the crawler-track unit evenly, and a drive shaft mounted in the crawler-track frame in bearings coaxially relative to the sleeve shaft, in order to transmit power from the forest machine to the crawler-track unit and to pivot the crawler-track unit to the pivot bearing belonging to the chassis of the forest machine. The crawler-track unit further includes a shaft mounted in bearings in the crawler-track frame for pivoting the drive wheel to the crawler-track frame at a distance from the drive shaft, and power-transmission means arranged between the drive shaft and the drive wheel, for transmitting power from the drive shaft to the drive wheel.

The construction of the crawler-track unit according to the invention, in which drive is brought from the forest machine to the crawler-track unit with the aid of a drive shaft mounted in bearings inside a sleeve shaft, the drive wheel is on a shaft separate from the drive shaft, and the crawler-track unit's power-transmission means are between the drive wheel and the drive shaft, permits a lower structure of the crawler-track unit, the ground properties of which are better than those of crawler-track units according to the prior art. The drive wheel mounted in bearings separately from the drive shaft permits the drive wheel to have a large angle of cover for the crawler mat, without the need for a high structure for the crawler-track unit, which large angle of cover causes in conventional structures, in which the drive wheel in on the drive shaft. At the same time, the operation of the crawler-track unit's power-transmission means permits the transmission of power from the engine of the forest machine right to the crawler mat, so that by using a crawler-track unit according to the invention the power line of an existing forest machine can be retained, replacing only the bogie casing and wheel hubs of a swing bogie according to the prior art. With the aid of the support means, the surface pressure of the crawler-track unit can be reduced, as the support means conform to the ground. The crawler-track unit according to the invention can be retrofitted to forest machines equipped with bogie wheels according to the prior art.

In this connection, the term modularity of the crawler-track unit refers to the fact that, with its aid it is possible to replace the sets of bogie wheels in an existing forest machine with the crawler-track unit, without alterations to the forest machine. Thus the forest machine can be used, according to operating conditions, equipped with either a set of bogie wheels and/or with a crawler-track unit. It is also possible to replace, for example, the rearmost swing bogie casing and wheels of an 8-wheeled forwarder, for example that under the load space, with a crawler-track unit according to the invention, even though a conventional set of swing bogie axles equipped with wheels is still used under the front of the machine's chassis.

The crawler mat is preferably arranged to circulate around the crawler-track frame. The total width of the forest machine will then remain as before while nevertheless achieving the greatest possible surface area for the crawler mat.

Alternatively, in the crawler-track unit under the load space, a crawler mat can be used, which is supported by wheels and support means brought outside the outside of the crawler-track frame. In this way, additional space is obtained between the crawler mat and the centre part of the load space.

The drive shaft and the sleeve shaft are preferably mounted in bearings symmetrically in the middle of the crawler-track frame. The symmetrical pivoting of the crawler-track unit to the forest machine permits good driving qualities in both directions. This is an important property, as a significant part of a forest machine's operating time is taken up in reverse movement.

The drive wheel is preferably situated in the crawler-track frame, in the direction of travel of the crawler-track unit before or after the support means, in such a way that the angle of incidence of the crawler mat when moving in the driving direction of the crawler-track unit, is 20-70°, preferably 30-50°. The crawler-track unit will then climb easily over stones and other obstacles and the ability of the crawler-track unit to progress will then be better than crawler-track units according to the prior art.

The crawler-track frame preferably includes an upper surface, which is arranged to form a structure that rises towards the centre of crawler-track frame in both driving directions. Such a structure that, seen from the side of the crawler-track unit, recalls a ridged roof, permits the crawler-track unit to rotate freely around the pivot bearing, without touching the load space.

The drive wheel and idler wheel are preferably symmetrically on both sides relative to the centre point of the crawler-track frame. The symmetrical construction facilitates the manufacture of the crawler-track frame and creates good driving properties in both directions, both when running forwards and when reversing.

The drive wheel is preferably located at the most acute angle of the circulation of the crawler mat. At the most acute angle, the crawler mat will cover most of the drive wheel, in order to create maximum traction.

The crawler mat is preferably arranged to create at least 120°-cover of the drive wheel. In other words, the crawler mat runs around the drive wheel, covering a sector of at least 120° of the drive wheel. Thus it is possible to ensure sufficient friction or a shape-locking joint between the crawler mat or its drive teeth and fins, and the drive wheel. The contact of the drive wheel and the crawler mat can be implemented in several different, as such known, ways, either in such a way that the drive wheel penetrates the outer surface of the crawler mat (there are openings extending through the crawler mat at the locations of the teeth of the drive wheel), or in such a way that toothing is arranged on the inner circumference of the crawler mat, from which the drive wheel transmits power to the crawler mat without puncturing the outer surface of the crawler mat.

The support means are preferably attached flexibly to the undersurface of the crawler-track frame. They can then flex one at a time independently of each other.

The height of the crawler-track unit can be 25-60%, preferably 30-45% of the length of the crawler-track unit. By means of such a geometry of the crawler-track unit, the tendency of the crawler-track unit to rise vertically when crossing obstacles and when under traction strain can be prevented or limited.

The power-transmission means of the crawler-track unit are preferably mechanical. Mechanical power-transmission means in the crawler-track unit permit the crawler-track unit to be used modularly in existing forest machines in place of a set of bogie wheels by transmitting power from the crawler-track unit's drive shaft to the drive wheel.

Preferably in the forest machine, the transmission means of the forest machine and the transmission means of the crawler-track unit are arranged to transmit power from the engine to each drive wheel of the crawler-track unit. Thus the drive wheel can be at the side of the crawler-track unit's drive shaft, without, for example, using a hydrostatic or electric hub motor utilizing bendable and flexible conductors.

According to one embodiment, the crawler-track unit's transmission means are gearwheel means. The advantage of gearwheel means can be regarded as being a longer service life and usually less need for maintenance than, for example, belt-drive means.

According to a second embodiment, the crawler-track unit's transmission means are chain-drive means. As a construction, a chain is a solution with economical investment costs and also an alternative that is relatively maintenance free.

According to a third embodiment, the crawler-track unit's transmission means include at least one drive shaft and an angle gear. Irrespective of the more detailed construction of a mechanical power line, by using a mechanical power line it is possible to utilize the existing power line and, for example, differential locks in the machine. Thus, if necessary, a great deal of power, depending on the dimensioning of the transmission possible all the machine's traction power, can be transmitted from one crawler-track frame and its wheels or from the crawler-track unit, for moving the machine on the ground. This property becomes emphasized on ground and in driving situations, in which only one or two of the forest machine's, for example, four crawler-track units may have traction.

According to a fourth embodiment, the crawler-track unit's transmission means are belt-drive means. As a construction, a belt is economical in investment costs and quite simple as an object of maintenance.

According to one embodiment, the support means include at least two auxiliary crawler wheels, of which at least some are pivoted to the crawler-track frame by means of an arm. With the aid of the auxiliary crawler wheels, the crawler mat can be directed to such a circulation, in which the angles of incidence and lag of the crawler-track unit remain large. Suspension with the aid of arms permits each auxiliary crawler wheel to move independently according to the unevenness of the ground, thus reducing the surface pressure caused by the crawler-track unit. The flexing permits the support means to conform to the shapes of the surface of the ground, so that the surface pressure remains even. In addition, suspension implemented in this way permits the machine to have a higher driving speed, without endangering the ergonomics of the driver and the durability of the structure of the forest machine.

According to another embodiment, the support means includes at least one planar support element. The support element permits the surface pressure to be distributed over a larger surface area. The support element can be, for example, a plate, rail, or slider, against which the crawler mat slides.

The drive shaft is preferably arranged to transmit power directly from the transmission means of the forest machine to the transmission means of the crawler-track unit. Thus, the transmission can be implemented simply to the drive wheel.

The crawler-track frame can be pivoted to the machine's chassis essentially to the rigidly fitted centre part of the swing bogie. The drive shaft can be arranged to transmit power from this part, which is rigidly arranged in relation to the machine's chassis, to the bogie casing by means of the drive shaft.

The crawler-track unit is preferably arranged to be supported on the ground mainly with the aid of the circulation of the crawler mat supported on the support means. Thus the support means permitting flexing conform to the ground. The support means can be themselves flexible, or they can be suspended flexibly.

The drive wheel and support means can be manufactured from metal, plastic, or rubber, essentially as solid structures. The drive wheel and support means manufactured as solid structures withstand stress well and require less maintenance and are cheaper that pneumatic tyres.

Preferably pivot bearing of the power-transmission means comprise bolt holes for attachment of crawler-track unit into the pivot bearing with the aid of sleeve shaft of the crawler-track unit. Therefore the crawler-track unit can be a direct replacement of the set of bogie wheels according prior art.

The drive wheel can be arranged to transmit traction to the crawler mat by shape-locking. Shape-locked transmission will ensure good traction in all circumstances.

According to one embodiment, the auxiliary crawler wheels are pivoted to the frame with the aid of swing bogies. The swing bogies are then simple and small swing bogies, which permit the crawler to conform to small unevenness in the ground to permit the best traction and a small surface pressure. Having the crawler mat conform to the shapes of the ground also reduces the stresses imposed on it.

Preferably at least some of the auxiliary crawler wheels have shock absorbers and/or are arranged to be spring-loaded. This improves the driving comfort and stability of the forest machine and reduces the surface pressure imposed by the crawler-track unit on the ground, particularly in the case of small obstacles such as stones and tree-stumps. Particularly, the suspension permits an increase in the driving speed of the forest machine over uneven ground without essentially endangering the driver's ergonomics, the stability of the forest machine, or the durability of the forest machine's structures.

The intention of the forest machine according to the invention can be achieved by means of a forest machine, which includes a chassis, at least two modular crawler-track units, each mounted on a pivot swingably at each side of the chassis, an engine, and the forest machine's transmission means for transmitting power from the engine to each crawler-track unit. In the forest machine, each crawler-track unit includes a crawler-track frame, a sleeve shaft attached to the crawler-track frame for supporting the crawler-track on a pivot bearing belonging to the forest machine, a crawler mat arranged to circulate around the crawler-track frame in order to distribute the surface pressure of the crawler-track unit, and at least one drive wheel and idler wheel mounted in bearings inside the circulation of the crawler mat to rotate and support the crawler mat. In addition, the crawler-track unit includes support means arranged inside the circulation of the crawler mat in order to support that part of the circulation that is against the ground, which support means are arranged to conform to the shape of the surface of the ground in order to distribute the surface pressure of the crawler-track unit evenly, and a drive shaft mounted in bearings on the crawler-track frame coaxially relative to the sleeve shaft of the crawler-track unit, for transmitting power from the forest machine to the crawler-track unit and for pivoting the crawler-track unit to the pivot bearing belonging to the chassis of the forest machine. Further, the crawler-track unit includes a shaft mounted in bearings on the crawler-track frame for pivoting the drive wheel to the crawler-track frame at a distance from the drive shaft and transmission means arranged between the shaft and the drive shaft for transmitting power from the drive shaft to the drive wheel.

The drive shaft may be arranged to run through the centre of the pivot bearing, in order to pivot the crawler-track to the chassis of the forest machine. This permits a forest machine according to the prior art, equipped with bogie wheels, in which the bogie casings of the set of swing-bogie axles are mounted in bearings with pivot bearings of the set of swing-bogie axles essentially rigidly to the centre part fitted to the chassis of the machine, to be used as the chassis of the forest machine. Thus, it is possible to use the same power line of the forest machine unaltered. This modular construction is an advantageous solution for both the forest machine's owner and manufacturer, as it permits the forest machine's manufacturing costs to be kept lower as the machine's chassis structures need not be specially built for a crawler-track application. A conventional forwarder equipped with sets of swing-bogie axles can also be retrofitted with crawler-track units according to the invention, if it is wished to change the forest machine's operating purpose, for example, particularly for timber harvesting on soft ground and it is wished to reduce the surface pressure imposed by the forest machine. It can also be possible to separately equip the forest machine, for example, according to the seasons, with either crawler-track units or swing bogies, or a combination of these.

The transmission ratio of the transmission means of the crawler-track unit is preferably arranged to be such that the transmission ratio of the entire transmission of the forest machine from the engine to the drive wheel remains the same as in bogie-wheel constructions according to the prior art. Thus the forest machine's transmission can be used without alteration and the forest machine will move at the same speed as when implemented with the aid of bogie wheels, the engine revolutions remaining the same. If necessary, the transmission ratios of a machine's mechanical power line to be kept unchanged can naturally be arranged as desired, for example, by altering the transmission ratios of the swing bogie's set of drive wheels or distribution gears. If the transmission ratios must altered, for example, in the set of drive wheels (differential), part of the modularity will, however, be lost, so that naturally this should be avoided.

The purpose of the forest machine assembly can be achieved with a forest machine assembly having a forest machine according to the invention and interchangeable units namely crawler-track unit and set of swing bogie, each interchangeable unit having a sleeve shaft for attachment of the unit in to the outer race of the pivot bearing. In this assembly the crawler-track unit is easily interchangeable with the set of swing bogie since the same point of attachment can be used without modifications.

Preferably each interchangeable unit has a drive shaft arranged to be connected with the power-transmission means of the forest machine and being coaxially with the sleeve shaft.

The forest machine preferably includes at least one mechanical differential lock for directing power through the set of drive wheels of the set of swing-bogie axles to the side of the set of swing-bogie axles that has traction, either to the pairs of wheels on one side of the set of swing-bogie axles or to the drive wheel of the crawler-track unit according to the invention. The mechanical differential lock can be, for example, a toothed lock. This permits the forest machine to be driven more easily in difficult ground conditions. Drive can be distributed through a mechanical differential lock considerably more easily and better than with the aid of known throttle solutions of hydraulic systems. In a throttle construction implemented with the aid of flow distribution valves, a considerable amount of pressure energy is lost as heat, nor can the drive be properly distributed to a single drive wheel, without losing a considerable amount of power. Often the fact that drive power cannot be obtained from an individual hub motor more than the maximum drive power dimensioned for it proves to be a problem in transmission based on hub motors. In other words, in a situation in which the friction between the chassis of the machine and the ground has been reduced for several wheels or crawler-track units, the drive power available from one wheel or crawler-track unit remains very limited, compared to a mechanical construction equipped with differential locks, in which, if necessary, all the drive power can be transferred to the ground through one wheel or crawler-track unit. In this connection, reference to a set of swing-bogie axles implies a construction according to the whole of FIG. 2, which includes power transmission with possible differentials as well as swing-bogie structures, whereas when reference to swing-bogies implies only bogie casings and hubs.

Compared to forest machines according to the prior art, in which a set of bogie-wheels and a crawler mat set around them is used, the forest machine according to the invention achieves a lower surface pressure, better progression over the ground, and a simpler construction. In the crawler-track unit, drive need only be arranged to a single drive wheel, whereas in solutions according to the prior art each wheel has its own hub planet gearing. In addition, the crawler-track unit according to the invention is modular and possible to install in already existing forest machines. By means of the crawler-track unit according to the invention a lower surface pressure imposed on the ground than with solutions of the prior art is achieved.

BRIEF DESCRIPTION OF THE DRAWINGS

In the following, the invention is examined in detail with reference to the accompanying drawings depicting some embodiments of the invention, in which.

DETAILED DESCRIPTION OF THE INVENTION

Figure 1:
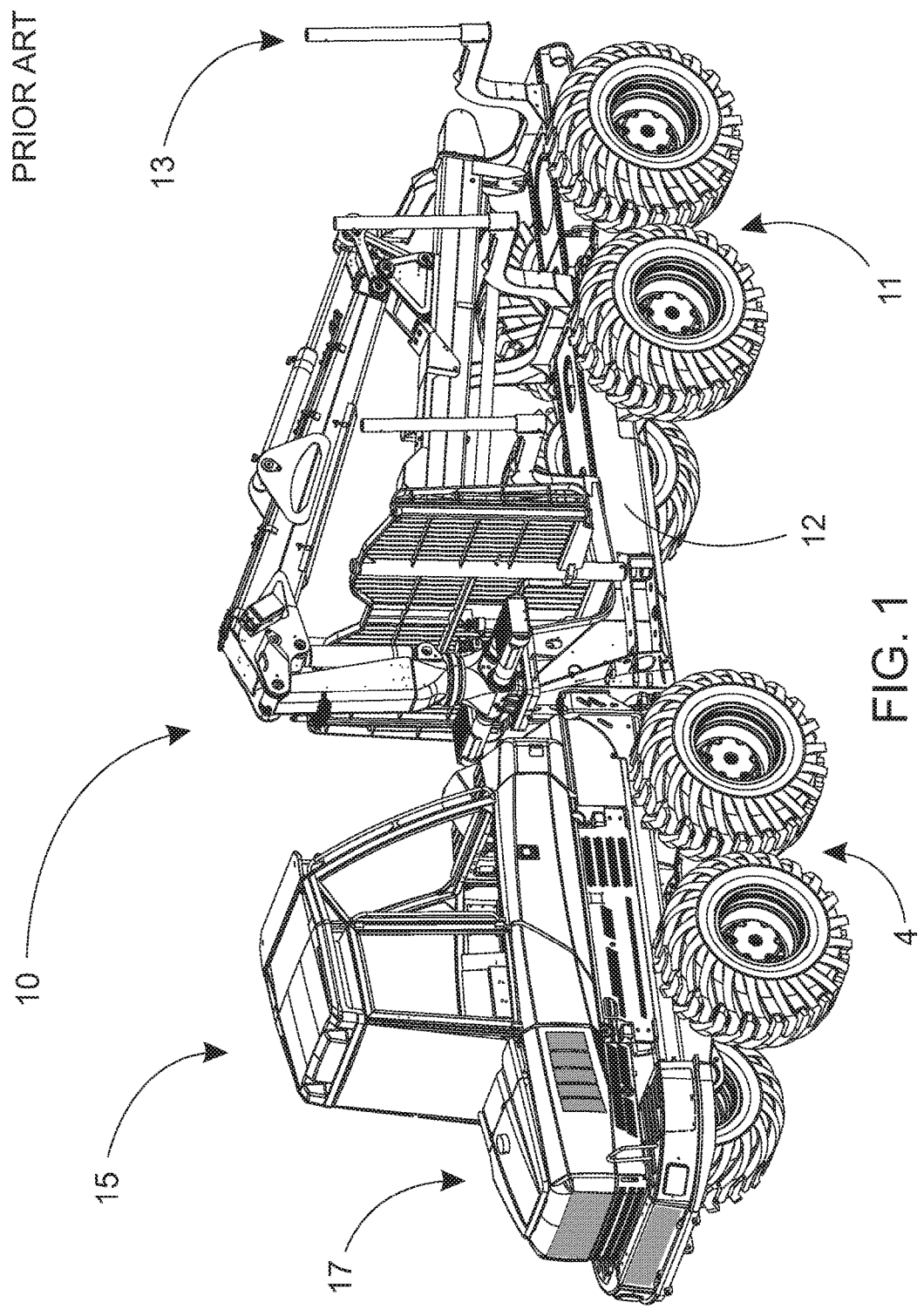
FIG. 1 shows an axonometric view of a forest machine according to the prior art.

FIG. 1 shows a forest machine 10 according to the prior art, which can be a forest tractor according to the figure, which is used for collecting already felled trees and transporting them from the forest. The forest machine 10 according to the prior art is supported on the ground with the aid of bogie wheels 11 on bogie shafts, in which on each bogie shaft there are preferably two drive wheels with pneumatic rubber tyres. A rubber tyre is, however, an expensive construction, the flexibility of which is very limited due to the high pressure used in it. The use of a high pressure seeks to ensure a sufficient load-bearing capacity also when the forest machine is fully loaded. Thus, such a forest machine 10 causes a high surface pressure on the ground and, through that, damage to the ground. The drive power of the forest machine 10 according to FIG. 1 is obtained from an engine 17, from which the power is transmitted as a combination of hydrostatic and mechanical power transmission through the bogie wheels 11 drive shaft supporting the swing bogie to the individual wheels. Such a construction requires each wheel to have a separate hub planet gear to create the drive, which raises the price of the construction.

Figure 2:
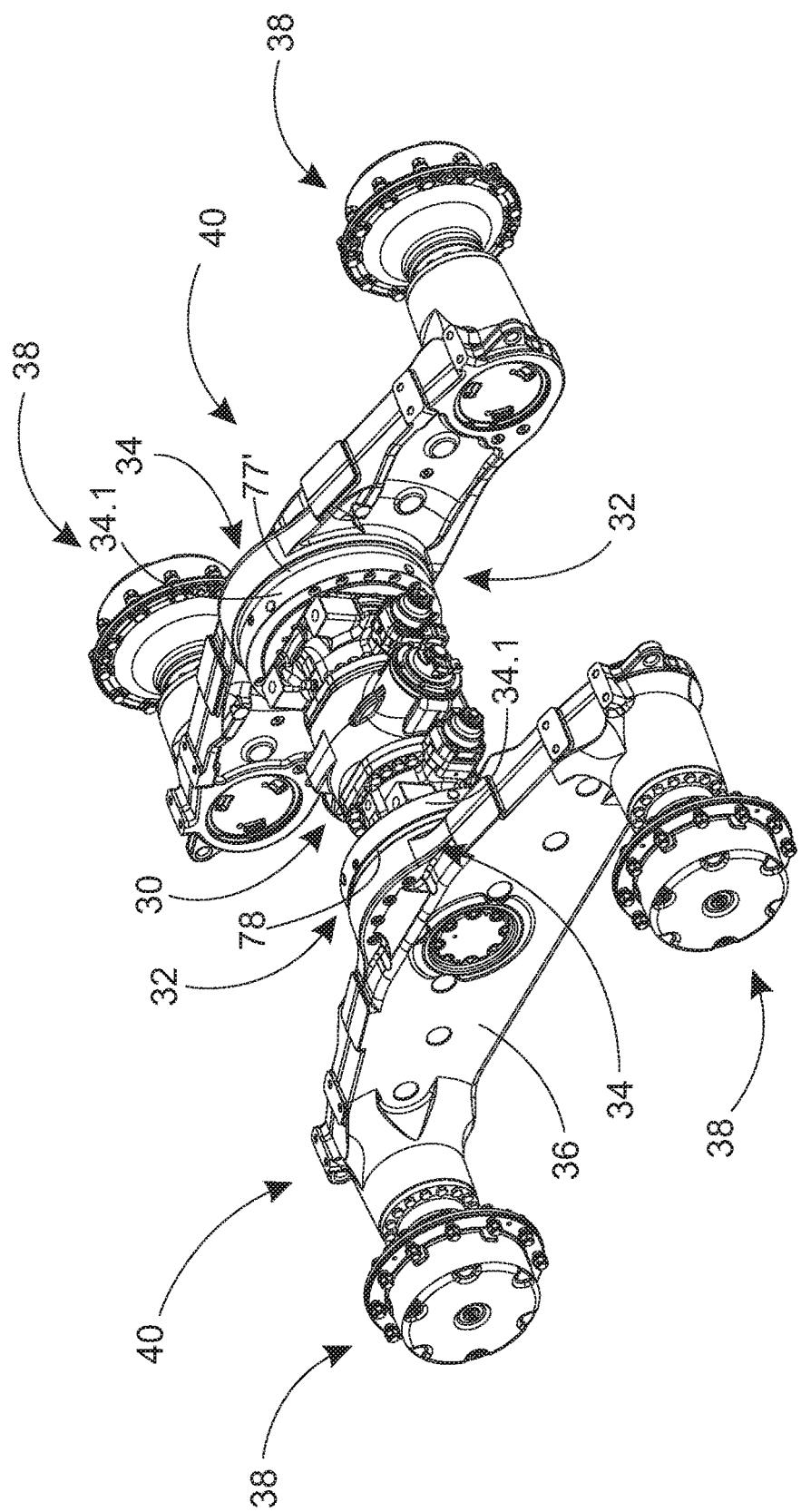
FIG. 2 shows an axonometric view of the power transmission of the bogie axles of a forest machine according to the prior art.

FIG. 2 shows in greater detail the construction of the power transmission of the forest machine according to the invention equipped with a set of bogie wheels according to prior art of FIG. 1. For example, the power taken off mechanically from the diesel engine of the forest machine is converted, with the aid of a high-pressure hydraulic pump, into hydraulic pressure. The hydrostatic and so-called driving-power transmission act as a kind of stepless gearing adjusting the speed of motion of the machine. At the set of bogie wheels, the pressure is again converted into mechanical kinetic energy and transmitted to the set of drive wheels 30 (differentials) according to FIG. 2 with the aid of a cardan shaft, which drive wheels distribute the power through shaft tubes 32 to the pivot shafts of the sets of bogie wheels supported on pivot bearings 34. The shafts supported by the pivot bearings attach the bogie casings 36 in a pivoted manner to the forest machine and the hubs 38 of the wheels are attached in turn to the bogie casings 36. The shaft tubes can contain brakes for braking the wheels.

In a forest machine according to the invention, the construction of a forest machine of FIG. 2 can be used in such a way that the crawler-track units of the forest machine according to the invention replace entirely or partly the swing bogie from the pivot bearings 34 to the wheels. In other words, the set of drive wheels 30, the shaft tubes 32 as well as pivot bearings 34 and generally the entire rest of the structure of the forest machine except for the structure of the bogie wheels, can be used entirely unchanged from the construction according to FIG. 2. The basic construction and power line of the forest machine according to the invention can be taken straight from the forest machine of the prior art according to FIG. 1. The entire swing bogie can be replaced with a crawler-track unit according to FIGS. 3-6.

Figure 3:
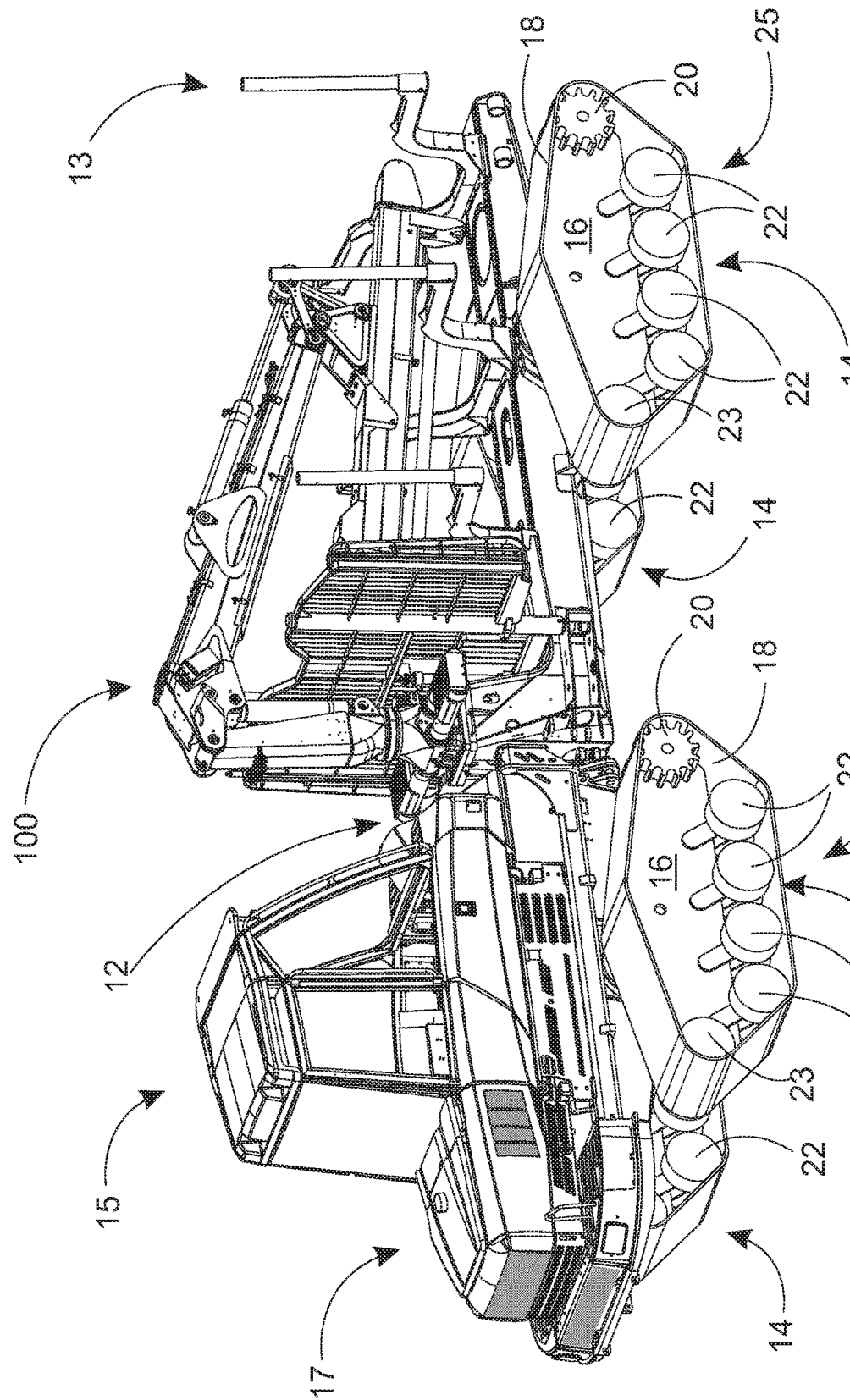
FIG. 3 shows an axonometric view of a forest machine according to the invention.

FIG. 3 shows one embodiment of the forest machine according to the invention. In this embodiment, all of the wheels of the forest machine 100 according to the prior art shown in FIG. 1 are replaced with crawler-track units 14 according to the invention. More specifically, the forest machine 100 according to the invention includes chassis 12, at least two crawler-track units 14 pivoted to each side of the chassis 12, the engine 17, and the forest machine's power-transmission means 70 including set of drive wheels 30, differential and brakes (FIG. 4) for transmitting power from the engine to each crawler-track unit 14. FIG. 3 shows only part of the power-transmission means of the forest machine, but it should be understood that the missing part can correspond entirely to that in the forest machine according to the prior art of FIG. 1. Each crawler-track unit 14 includes a crawler-track frame 16 according to FIGS. 3-6, a sleeve shaft 77 attached to the crawler-track frame 16 for supporting the crawler-track frame on a pivot bearing 34 belonging to the forest machine, a drive shaft 60 mounted in bearings 106 at one end to the crawler-track frame 16 coaxially relative to the sleeve shaft 77, and at the other end to the chassis 12, and a crawler mat 18 arranged in an endless circulation around the crawler-track frame 16. Further, the crawler-track unit 14 includes at least one drive wheel 20 for rotating the crawler mat 18, mounted in the crawler-track frame 16 on shaft 80 that is separate from the drive shaft 60, and power-transmission means 41 of the crawler-track unit for transmitting power from the drive shaft 60 to the drive wheel 20. In addition, the crawler-track unit 14 further includes support means 25 arranged to conform to the shape of the surface of the ground, for distributing the surface pressure of the crawler-track unit 14 evenly.

Differing from FIG. 3, the forest machine can also be implemented in such a way that only the wheels of one bogie-wheel pair are replaced with a crawler-track unit, so that, for example, the front most bogie-wheel pairs of the forest machine still remain to be implemented with the aid of wheels or bogie wheels. In that case, the bogie wheels under the load space 13 in FIG. 3 have been replaced with a crawler-track unit 14, the surface pressure of which is considerably lower, which prevents ground damage from arising. The crawler-track units can also be mutually of different sizes, preferably in such a way that the rearmost crawler-track unit is longer, in order to increase the load-carrying surface area. The total weight of the forest machine according to the invention also remains lighter than that of a construction according to the prior art, in which a steel crawler mat is placed around the bogie wheels in order to reduce the surface area.

Figure 5:
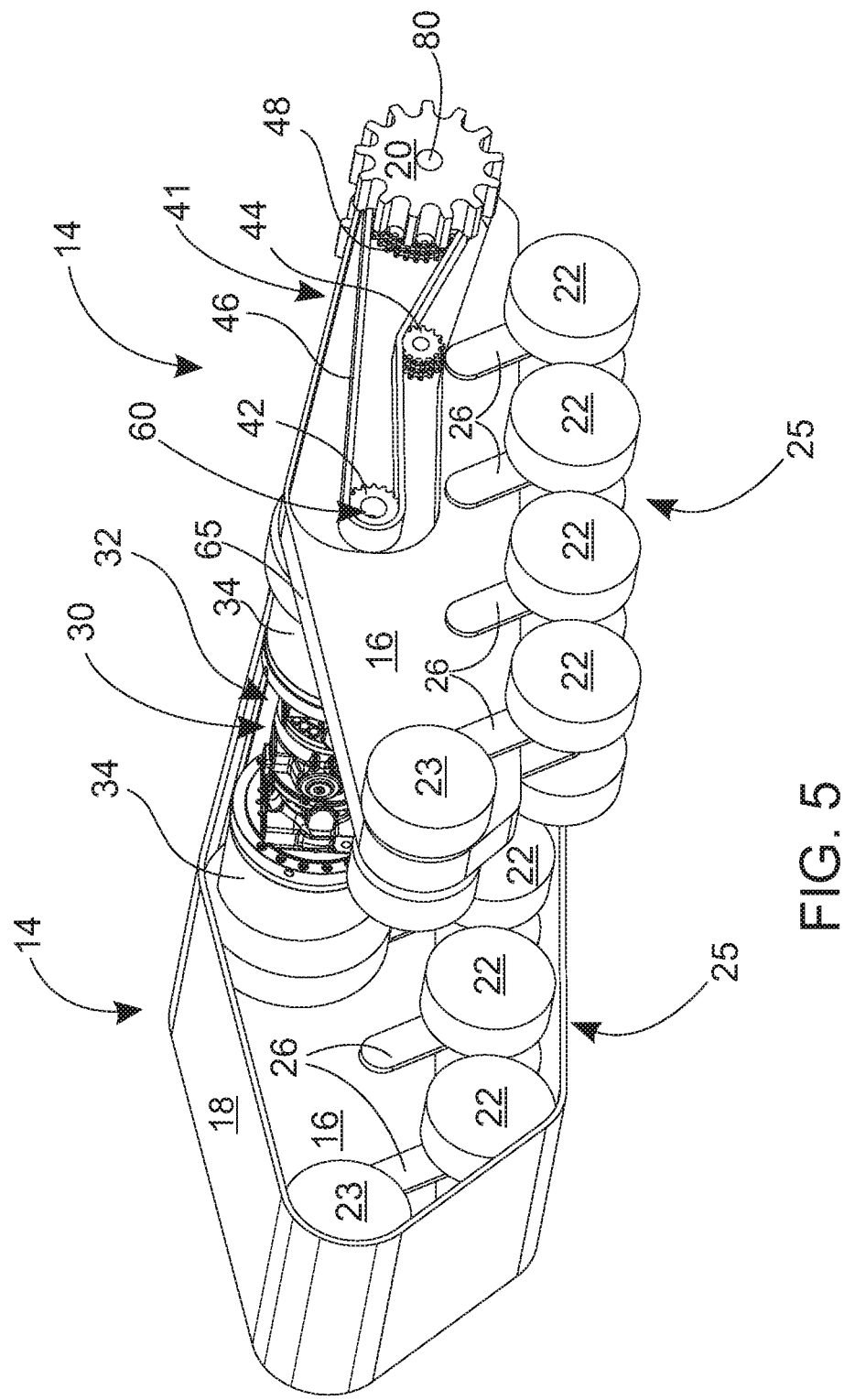
FIG. 5 shows an axonometric and partly cross-sectioned view of crawler-track units according to the invention and with the power transmission between them and the forest machine detached.
Figure 8A:
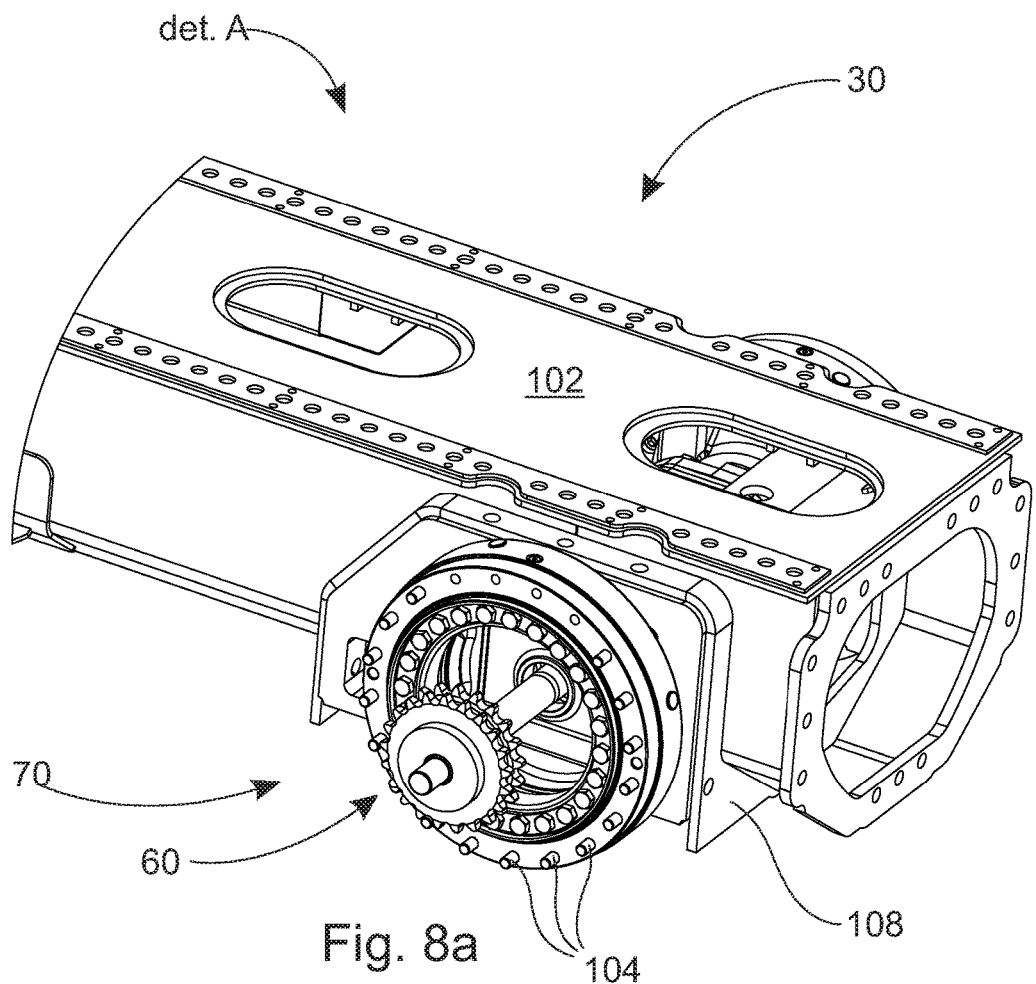
FIG. 8a shows an enlargement of detail A of FIG. 8.
Figure 8B:
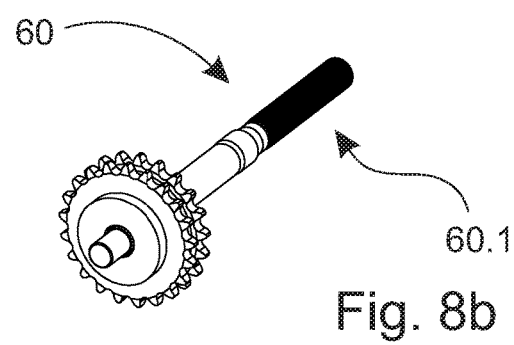
FIG. 8b shows an axonometric view of the drive shaft of the power-transmission means of the forest machine separately.

FIG. 5 shows the construction of the crawler-track unit 14 in greater detail. The crawler-track frame 16 of the crawler-track unit can be a casing structure manufactured from steel, which contains inside it the power-transmission means 41 of the crawler-track unit and bearings 106 (FIG. 6) for the drive shaft 60. In this connection, the term drive shaft refers to the shaft, by means of which power is transmitted from the forest machine's power-transmission means to the crawler-track unit. The drive shaft 60 can be equipped with splines 60.1 shown in FIG. 8b or with bores or grooves for transmitting rotational movement. A drive shaft with splines can also be called as bore axle. The drive shaft comprises a form-locking connection that is used for connection between the drive shaft and power-transmission means. In the embodiment of FIG. 8b the form-locking connection is achieved with use of splines 60.1 running in the longitudinal direction of the drive shaft 60. More specifically, the drive shaft is set in the centre of the pivot bearing and power is transmitted through the drive shaft from the forest machine's power-transmission means to the crawler-track unit's power-transmission means. The sleeve shaft 77 is preferably attached symmetrically in the centre of the crawler-track frame as well as the drive shaft 60 is preferably mounted in bearings symmetrically in the centre of the crawler-track frame, so that the driving properties of the crawler-track unit will be good in both directions.

Figure 6:
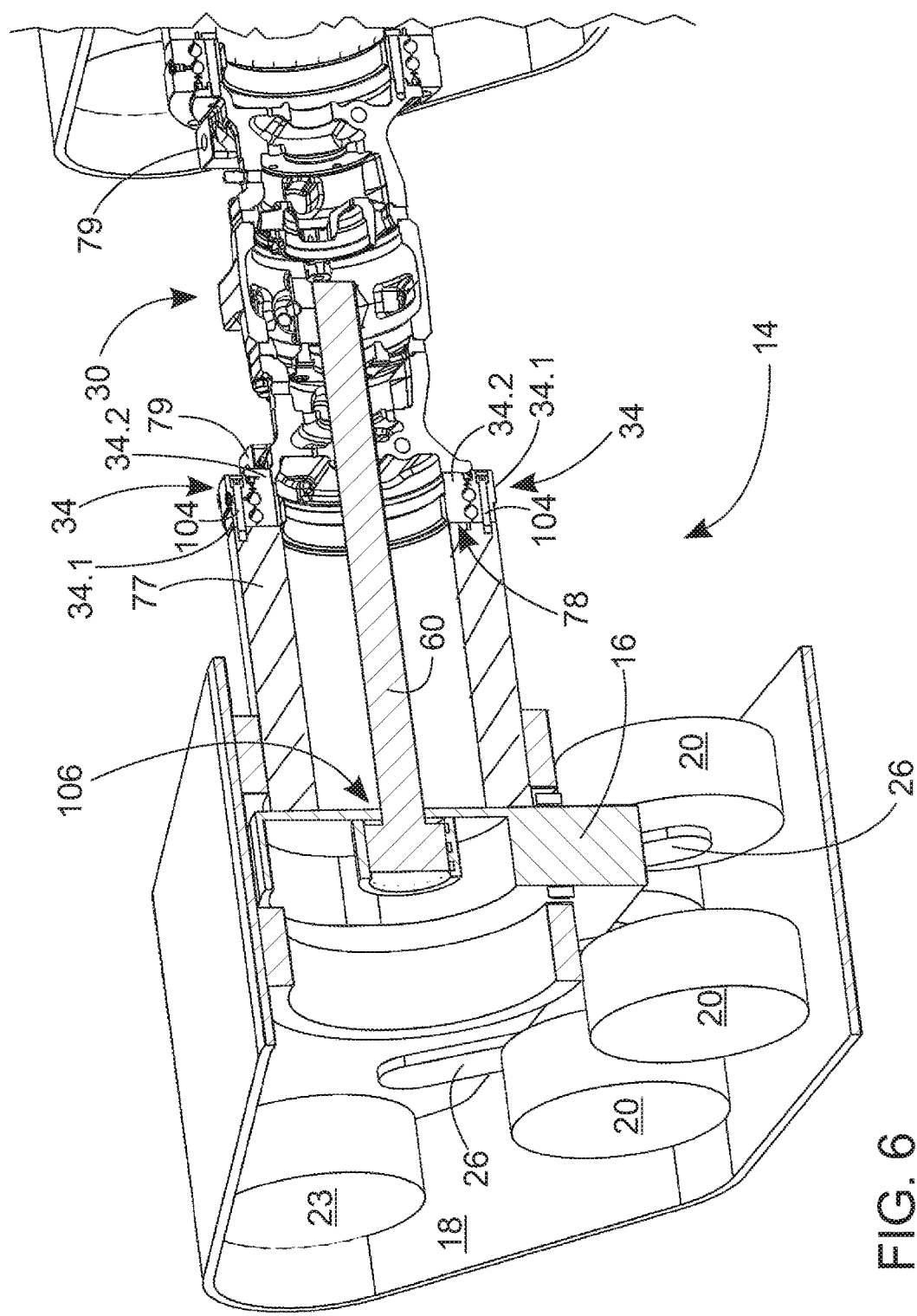
FIG. 6 shows an axonometric and partly cross-sectioned view of the mounting of a crawler-track unit according to the invention in bearings to the power transmission of a forest machine.

According to FIG. 6, the crawler-track frame 16 is mounted in bearings with the aid of the sleeve shaft 77 in the pivot bearing 34 coaxially relative to the drive shaft 60. To be more precise, the sleeve shaft 77 is attached to the pivot bearing 34 using bolts 104. Bolts 104 are the same bolts that are used to connect a set of bogie wheels according to prior art shown in FIG. 2 into the pivot bearing 34. The tightening of the bolts can be made by either separating the chassis 102 shown in FIGS. 7 and 8a from the power-transmission means 70 or by rotating the outer race 34.1 of the pivot bearing 34 over the inner race 34.2 of the pivot bearing 34 so that the bolts 104 can be tightening from below the power-transmission means 70. Reference number 108 indicates a part of the chassis 102. In FIG. 6, the reference number 78 refers to the point of attachment of the set of drive wheels 30, from which the set of drive wheels i.e. power-transmission means 70, is attached permanently to the forest machine's chassis. In this connection, it should be understood that the part on the left-hand side of the attachment point 78, i.e. the crawler-track unit according to the invention, is supported on the outer race 34.1 of the pivot bearing 34 and rotates with its aid, whereas the set of drive wheels and its components are fixed. Reference number 79 refers to bolt holes which are used for connecting the chassis 102 of the forest machine to the power-transmission means 70 of the forest machine. The power-transmission means of the forest machine according to the invention can be for example a product marketed by German manufacturer NAF Neunkirchener Achsenfabrik AG with a product name TAP OR PTA in the size range of 75. These power-transmission means of NAF comprise the set of drive wheels 30 including shaft tubes 32 and pivot bearings 34 attached to the shaft tubes 32, and the set of bogie wheels including the bogie casing 36 and a short sleeve shaft 77' (see FIG. 2). The bogie casing 36 is attached to the outer race 34.1 of the pivot bearing 34 using the short sleeve shaft 77' of the set of bogie wheels.

In order to use a crawler-track unit according to the invention interchangeably a with forest machine the connection between the inner race 34.2 of the pivot bearing 34 and the short sleeve shaft 77' of the set of bogie wheels is opened by opening the bolts 104 securing the connection. After the connection has been opened the bogie casing 36 and the short sleeve shaft 77' can be removed. After this the crawler-track unit 14 according to the invention can be connected to the outer race 34.1 of the pivot bearing 34 from its sleeve shaft 77 by using preferably the same bolts 104 for attachment.

Figure 7:
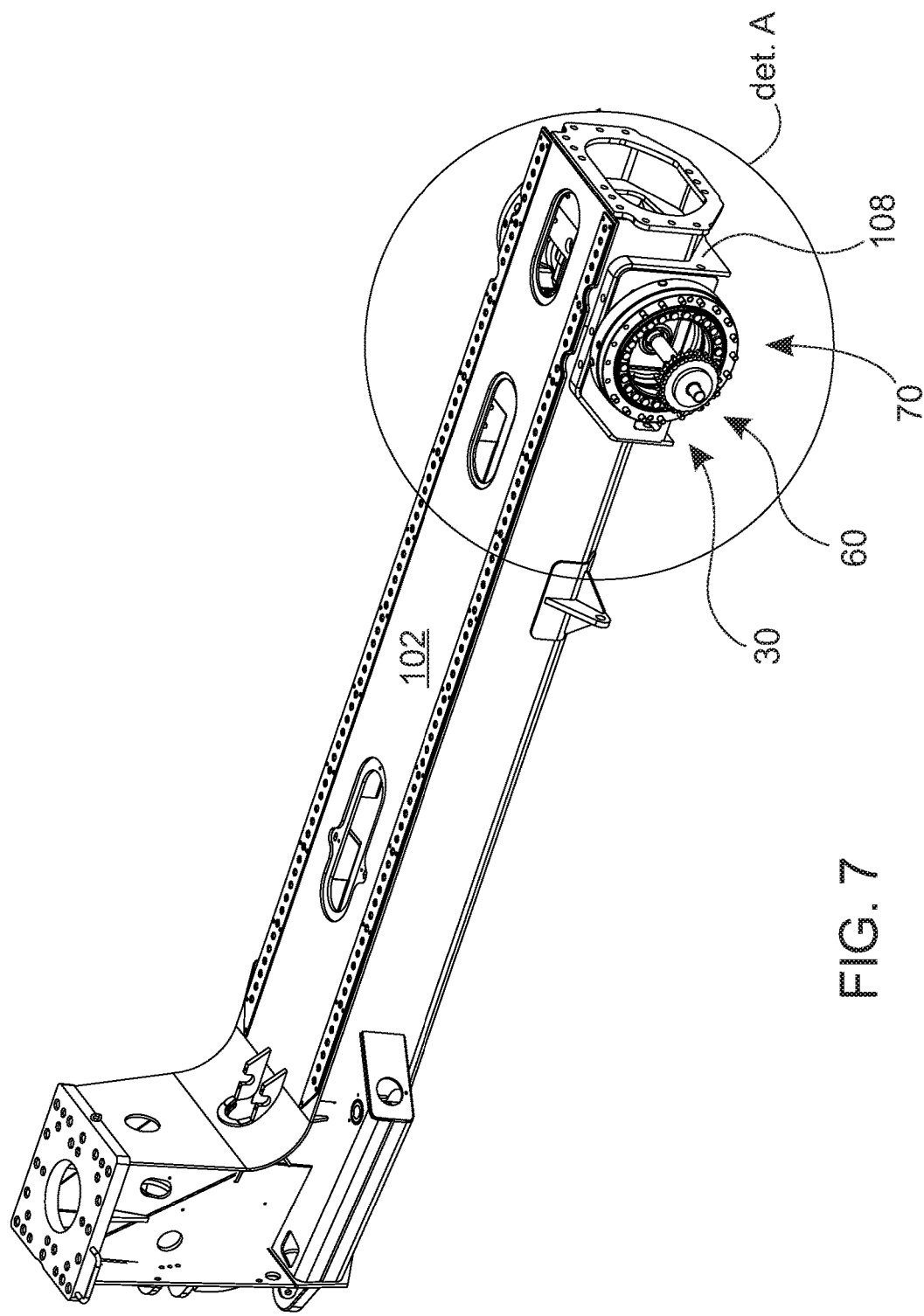
FIG. 7 shows an axonometric view of the chassis and power-transmission means of the forest machine without the crawler-track unit according to the invention.

FIG. 7 shows the chassis 102 of the forest machine separately with the power-transmission means 70 attached to it. In FIG. 7 the set of bogie wheels according to prior art shown on FIG. 2 have been removed. FIG. 8a shows an enlargement of detail A of FIG. 7. The same bolts holes 112 shown in FIG. 4 and preferably also the same bolts 104 shown in FIG. 8a used for attaching the set of bogie wheels according to prior art can be used for attaching the crawler-track unit 14 according to the invention to the power-transmission means 70 of the forest machine.

Figure 4:
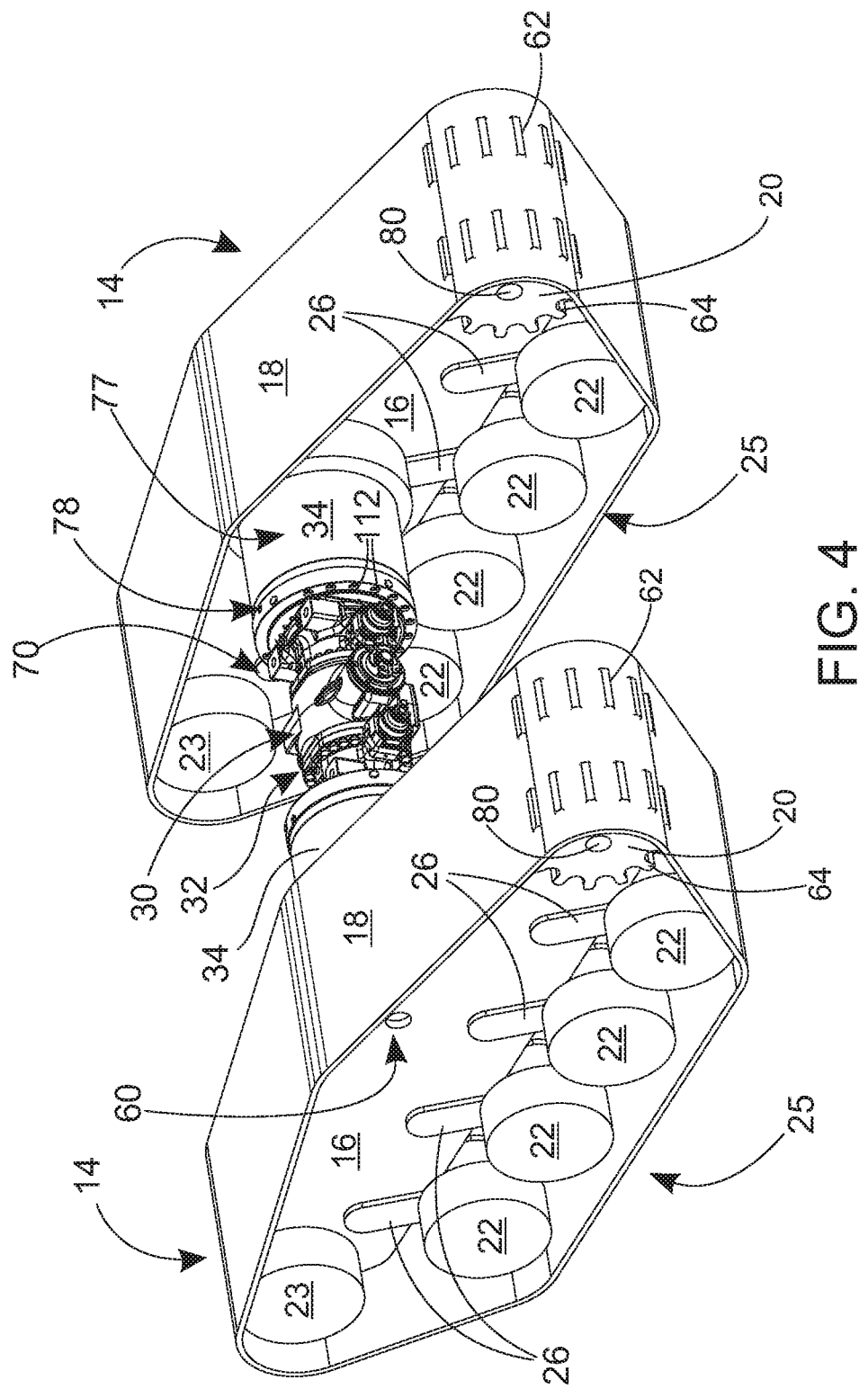
FIG. 4 shows an axonometric view of crawler-track units according to the invention in a forest machine and with the power transmission between them and the forest machine detached.

According to FIG. 4, the drive wheel 20 and one idler wheel 23 are mounted in bearings in the crawler-track frame 16 longitudinally at both ends of the crawler-track frame 16. Though in FIG. 4 the drive wheel 20 is located at the rear of the crawler-track unit in the direction of movement of the crawler-track unit, the drive wheel can also be located at the front in the direction of movement of the crawler-track unit, differing from FIGS. 4 and 5. In this connection, the term longitudinal direction of the crawler-track unit refers to the direction of movement of the crawler-track unit. In this embodiment, auxiliary crawler wheels 22 forming the support means 25 are pivoted to the crawler-track frame 16 preferably with the aid of arms 26 closer to the ground below the drive wheel 20 and the idler wheel 23 in between them in the crawler-track frame 16. Thus, the crawler wheels and auxiliary crawler wheels support the crawler mat 18 on its endless circulation. The circulation can, according to FIGS. 3-5, have the shape of a symmetrical pentangle relative to the vertical axis, the base of which is narrower than its central part. Using such a shape of circulation, large incidence and lag angles are created for the crawler-track unit, which facilitates crossing obstacles on the ground. The incidence angle of the crawler mat of the crawler-track unit when moving in the direction of travel of the crawler-track unit can be 20-70°, preferably 30-50°. Such an incidence angle ensures a good progression ability for the forest machine. In such a construction, only the flexible support means are continuously in contact with the ground and the drive wheel and idler wheel support the crawler mat in the upper part of its circulation. The means needed for tensioning the crawler mat can be arranged in the idler wheel, and can be, for example, loaded with the aid of a spring or hydraulic cylinder.

The shape of the circulation of the crawler mat is preferably such that the location of the drive shaft of the crawler-track unit forms the uppermost point of the circulation, i.e. the uppermost corner of the pentangle, from which the circulation of the crawler mat is directed downwards. In other words, the circulation of the crawler mat 18 is formed in such a way that the circulation of the crawler mat 18 and the upper surface 65 of the crawler-track frame 16 form a 'ridged roof', i.e. the circulation of the crawler mat 18 descends from the drive shaft 60 according to FIG. 5. Such a shape for the circulation of the crawler mat permits the crawler-track unit to pivot, without the crawler mat catching, for example, on the load space 13 above the crawler-track units, according to FIG. 3. In addition, by means of the shape of the circulation of the crawler mat of the crawler-track unit according to the embodiment a reasonably low structure is achieved for the crawler-track unit, which reduces the moment acting on the drive shaft of the crawler-track unit and reduces the tendency of the crawler-track unit to rise vertically when crossing obstacles. The height of the crawler-track unit can be 25-60%, preferably 30-45% of the length of the crawler-track unit. In this connection, the term height of the crawler-track unit refers to the highest point of the crawler-track unit at a perpendicular distance from the surface of the ground and the term length, in turn, the dimension of the crawler-track unit in the direction of travel of the crawler-track unit.

In FIG. 4, there are four auxiliary crawler wheels 22 belonging to the support means 25, pivoted to the crawler-track frame 16 with the aid of arms 26, but their number can vary according to the operating purpose. What is important in terms of the number of auxiliary crawler wheels in a row relative to the direction of travel of the crawler-track unit is that there are sufficiently many auxiliary crawler wheels for the pressure to be distributed evenly over the auxiliary crawler wheels, so that the surface pressure remains low. There can also be two parallel rows of wheels, as in FIG. 6. Alternatively, some of the auxiliary crawler wheels pivoted at the end of an arm can be replaced with a spring-loaded slider rail. The arm of the auxiliary crawler wheels can a straight combination of a shock absorber and a spring, or a fixed arm, which is supported on the crawler-track frame by means of a shock absorber and a spring. The arm is preferably sprung with the aid of a rubber buffer or a coil spring. According to one embodiment, when forming the support means in place of arms for the suspension of the auxiliary crawler wheels it is also possible to use swing bogies that are considerably smaller than the swing bogies of the prior art, with the aid of which two auxiliary crawler wheels can be pivoted together to the crawler-track frame. In such an embodiment, the auxiliary crawler wheels can also be broad rollers.

According to one embodiment, the crawler-track unit can include protective means attached to the crawler-track frame for protecting the outer edge of the crawler mat when the crawler-track unit travels directly towards a sharp stone. The protective means can, for example, be rails or beams like those known from excavators, which act as a kind of ski above the outer edges of the circulation of the crawler mat. Thus the crawler mat can be protected from slicing and cutting forces.

According to FIGS. 4 and 5, each crawler-track unit 14 preferably includes one drive wheel 20, which is located at the most acute angle of the circulation of the crawler mat 18. In this embodiment, the locations of the crawler-track wheels at the ends of the crawler-track frame are the most acute angles of the circulation. What is sought here is for the drive wheel 20 to have a sufficiently large contact surface area with the crawler mat 18. In other words, the drive wheel 20 has a sufficiently large cover angle, so that sufficiently many of the teeth (not shown) belonging to the inner surface of the crawler mat 18 are in contact with the surface of the gearwheel-like drive wheel 20, transmitting power in a shape-locking form between the drive wheel and the crawler mat. Alternatively, the crawler mat can also be a perforated crawler mat 18 according to FIG. 4, in which there are openings 62, through which the teeth 64 of the drive wheel 20 penetrate transmitting power from the drive wheel 20 to the crawler mat 18. Thanks to the sufficient cover angle, the drive wheel can be made smaller than if the cover angle was smaller, such as, for example, in crawler-track units according to the prior art, in which the drive wheel is directly on the drive shaft of the crawler-track unit.

According to FIG. 5, the power-transmission means 41 of the crawler-track unit according to the invention are implemented mechanically. In the embodiment of FIG. 5, the mechanical implementation is a belt drive, with the aid of which power is transmitted from the drive shaft 60 of the crawler-track unit 14 to the drive wheel 20. At the crawler-track unit 14 end of the drive shaft there is preferably attached a toothed wheel 42, which the drive chain 46 runs around. A toothed wheel 48, which rotates the shaft 80 by means of the drive chain 46, is attached to the shaft 80 of the drive wheel 20. In addition, the power-transmission means 41 of the crawler-track unit preferably includes a tensioning toothed wheel 44, which, for example by spring-loading or with the aid of hydraulic pressure keeps the drive chain 46 tight and prevents the drive chain 46 from slipping. Instead of a drive belt, a chain, for example, which is a more durable alternative, can preferably be used. Though the power-transmission means are clearly shown in FIG. 5, it should be understood that the power-transmission means of the crawler-track unit are encased to protect them, for example, from snow, water, and mud. In addition, the crawler-track unit preferably includes means for lubricating the crawler-track unit's power-transmission means with oil.

Alternatively, power transmission between the crawler-track unit's drive shaft and the drive wheel can also be implemented with the aid of gearwheels, a cardan, or other similar mechanical power-transmission means. Thanks to the mechanical power transmission, the crawler-track unit can be manufactured to be relatively light, as it can be implemented without heavy hub motors, the size of which would become considerably large, in order to create sufficient power. Generally hub motors are required if the drive wheel is wished to be moved away from the crawler-track unit's drive shaft, or a continuation of it. The crawler-track unit then uses hydraulic power transmission internally, with the aid of which power is transmitted to the hub motor rotating the driving wheel. However, a problem with such a solution is that hydraulic power-transmission reduces the forest machine's usability in difficult ground conditions. Only a limited amount of driving power/output can be transmitted through an individual hub motor, which limits the use of the forest machine compared to traditional mechanical power-transmission. Generally, the term mechanical power transmission refers to power transmission which consists of, for example in the case of a forwarder, distribution gearing, pivot shafts, and sets of shafts installed in the forwarder's front and rear parts. Such a power transmission is able to transmit a considerably larger part of the total drive power through one wheel or pair of wheels on one shaft to the ground, particularly if the differential is of a type that can be locked.

The crawler track used in the crawler-track unit is preferably a rubber crawler track, which permits the crawler mat to conform well to the ground, in order to reduce the surface pressure. The crawler mat can be a crawler mat like one known from the prior art, in which there is toothing inside the circulation for transmitting the drive. The crawler mat can include steel reinforcements or similar, but the body of the crawler mat is always of an elastic material.

The forest machine according to the invention can be, for example, a forest tractor, a harvester, or some other corresponding work-machine chassis, which is used in applications demanding a low surface pressure. The size of the crawler-track unit can vary considerably as required from a forest machine operating with a single pair of crawler-track units with four auxiliary crawler wheels, to many crawler-track unit pairs equipped with as many as ten auxiliary crawler wheels.

In the direction of travel of the crawler-track unit, the crawler-track unit according to the invention can be 1-3-m long, 0.5-1.5-m wide, and 0.5-1.5-m high. The surface area of the crawler-track unit in contact with the ground is larger than that of a construction implemented with a corresponding set of bogie wheels and a mat coming on top of it. The length of the sleeve shaft can vary between different embodiments changing the distance between the crawler-track unit and the chassis of the forest machine.

It will be understood that the above description of the present invention is susceptible to various modifications, changes and adaptations, and that the same are intended to be comprehended within the meaning and range of equivalents of the appended claims.

The invention claimed is:

1. A modular crawler-track unit for a forest machine having an engine and a chassis with a pivot bearing, comprising:
   a crawler-track frame;
   a sleeve shaft attached to the crawler-track frame supporting the crawler-track frame on the pivot bearing belonging to the chassis of the forest machine;
   a crawler mat arranged in a circulation to distribute surface pressure of the crawler-track unit;
   at least one drive wheel, mounted in first bearings in the crawler-track frame inside the circulation of the crawler mat, to rotate and support the crawler mat;
   at least one idler wheel, mounted in second bearings in the crawler-track frame inside the circulation of the crawler mat, to support the crawler mat;
   a support structure arranged in the crawler-track frame, inside the circulation of the crawler mat, to support a part of the crawler mat that is against the ground, which support structure is arranged to conform according to a shape of a surface of the ground, to distribute surface pressure of the crawler-track unit evenly;
   a drive shaft mounted in third bearings in the crawler-track frame, coaxially with the sleeve shaft, to transmit power from the forest machine to the crawler-track unit and to pivot the crawler-track unit to the chassis of the forest machine;
   a shaft mounted in fourth bearings in the crawler-track frame to pivot the drive wheel to the crawler-track frame at a distance from the drive shaft; and
   a power-transmission fitted between the shaft and the drive shaft to transmit power from the drive shaft to the drive wheel.

2. The crawler-track unit according to claim 1, wherein the drive shaft and the sleeve shaft are mounted in the respective bearings coaxially in a centre of the crawler-track frame.

3. The crawler-track unit according to claim 1, wherein the drive wheel is located in the crawler-track frame before or after the support structure in a direction of travel of the crawler-track unit so that incidence angle of the crawler mat, when moving in the direction of travel of the crawler-track unit, is 20-70°.

4. The crawler-track unit according to claim 1, wherein the crawler-track frame comprises an upper surface arranged to rise towards a centre of the crawler-track frame in both directions of travel.

5. The crawler-track unit according to claim 1, wherein the drive wheel and the idler wheel are equally distant in the crawler-track frame from the drive shaft in a direction of travel of the crawler-track unit.

6. The crawler-track unit according to claim 1, wherein the drive wheel is located in a most acute angle of the circulation of the crawler mat.

7. The crawler-track unit according to claim 6, wherein the crawler mat is arranged to cover a sector of at least 120° of the drive wheel.

8. The crawler-track unit according to claim 1, wherein the support structure is flexibly attached directly to an undersurface of the crawler-track frame.

9. The crawler-track unit according to claim 1, wherein a height of the crawler-track unit is 25-60% of a length of the crawler-track unit.

10. The crawler-track unit according to claim 1, wherein the power-transmission is mechanical.

11. The crawler-track unit according to claim 1, wherein the support structure comprises at least two auxiliary crawler wheels, wherein some of the auxiliary crawler wheels are pivoted to the crawler-track frame by an arm.

12. A forest machine comprising a chassis, at least two modular crawler-track units each pivoted on one side of the chassis, an engine, a first power-transmission for transmitting power from the engine to each crawler-track unit and pivot bearings belonging to the power-transmission and having an inner race, an outer race and bolt holes for attachment of crawler-track unit into the pivot bearing with the aid of a sleeve shaft of the crawler-track unit, wherein each crawler-track unit comprises:
   a crawler-track frame;
   the sleeve shaft attached to the crawler-track frame and supporting the crawler-track frame in the outer race of the pivot bearing using bolts;
   a crawler mat arranged in a circulation to distribute surface pressure of the crawler-track unit;
   at least one drive wheel, mounted in first bearings in the crawler-track frame inside of the circulation of the crawler mat, to rotate and support the crawler mat;

at least one idler wheel, mounted in second bearings in the crawler-track frame inside the circulation of the crawler mat, to support the crawler mat;

support structure arranged in the crawler-track frame, inside of the circulation of the crawler mat, to support a part of the circulation that is against the ground, which support structure is arranged to conform according to a shape of a surface of the ground, in order to distribute surface pressure of the crawler-track unit evenly;

a drive shaft mounted in third bearings in the crawler-track frame coaxially with the sleeve shaft to transmit power from the forest machine to the crawler-track unit and to pivot the crawler-track unit to the chassis of the forest machine, a shaft mounted in fourth bearings on the crawler-track frame for pivoting the drive wheel to the crawler-track frame at a distance from the drive shaft; and a second power-transmission fitted between the shaft and the drive shaft to transmit power from the drive shaft to the drive wheel.

13. The forest machine according to claim 12, wherein the drive shaft is arranged to run through a centre of the pivot bearing to pivot the crawler-track unit to the chassis of the forest machine.

14. The forest machine assembly according to claim 12, wherein the crawler-track units are interchangeable and each has the sleeve shaft for attachment of the crawler track unit in the outer race of the pivot bearing.

15. The forest machine assembly according to claim 14, wherein the drive shaft of each interchangeable crawler track unit is arranged to be connected with the first power-transmission of the forest machine and to be coaxial with the sleeve shaft.

* * * * *